United States Patent
Le et al.

(10) Patent No.: US 7,024,756 B2
(45) Date of Patent: Apr. 11, 2006

(54) METHOD OF MAKING A PERPENDICULAR RECORDING MAGNETIC HEAD POLE TIP WITH AN ETCHABLE ADHESION CMP STOP LAYER

(75) Inventors: Quang Le, San Jose, CA (US); Jui-lung Li, San Jose, CA (US); Jeffrey S. Lille, Sunnyvale, CA (US); Son Van Nguyen, Los Gatos, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 104 days.

(21) Appl. No.: 10/631,706

(22) Filed: Jul. 30, 2003

(65) Prior Publication Data

US 2005/0024779 A1    Feb. 3, 2005

(51) Int. Cl.
  *G11B 5/187*   (2006.01)
  *B44C 1/22*    (2006.01)
(52) U.S. Cl. ............... 29/603.12; 29/603.15; 29/603.16; 29/603.18; 216/22; 216/48; 216/52; 204/192.34; 204/192.2
(58) Field of Classification Search ............. 29/603.12, 29/603.13, 603.14, 603.15, 603.16, 603.18; 29/603.07, 603.23; 360/122, 125; 216/22; 216/39, 48, 52; 204/192.1, 192.34, 192.2
See application file for complete search history.

(56) References Cited

U.S. PATENT DOCUMENTS

| | | | | |
|---|---|---|---|---|
| 4,735,679 | A | 4/1988 | Lasky | 156/636 |
| 5,505,834 | A * | 4/1996 | Chaug et al. | 204/192.2 X |
| 5,559,654 | A | 9/1996 | Das | 360/126 |
| 5,684,660 | A | 11/1997 | Gray et al. | 360/126 |
| 5,883,762 | A | 3/1999 | Calhoun et al. | 360/113 |
| 5,932,396 | A | 8/1999 | Kamijima | 430/320 |
| 6,069,015 | A | 5/2000 | Gray et al. | 438/3 |
| 6,320,725 | B1 | 11/2001 | Payne et al. | 360/125 |
| 6,346,183 | B1 | 2/2002 | Baer et al. | 205/119 |

FOREIGN PATENT DOCUMENTS

JP       2-295117    * 12/1990    ............... 216/22 X

* cited by examiner

*Primary Examiner*—A. Dexter Tugbang
(74) *Attorney, Agent, or Firm*—Law Offices of Imam

(57) ABSTRACT

The method of making a magnetic head assembly includes forming a second pole piece layer that is recessed from a head surface, forming a reactive ion etchable (RIEable) pole tip forming layer on the second pole piece layer, forming an adhesion/stop layer of tantalum (Ta) on the pole tip forming layer, forming a photoresist mask on the adhesion/stop layer with an opening for patterning the adhesion/stop layer and the pole tip forming layer with another opening, reactive ion etching (RIE) through the opening to form the other opening, forming the second pole piece pole tip in the other opening with a top which is above a top of the adhesion/stop layer and chemical mechanical polishing (CMP) the top of the second pole piece pole tip until the CMP contacts the adhesion/stop layer. The invention also includes the magnetic head made by such a process.

7 Claims, 12 Drawing Sheets

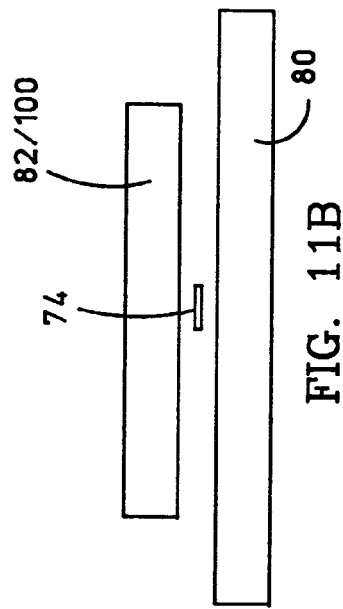
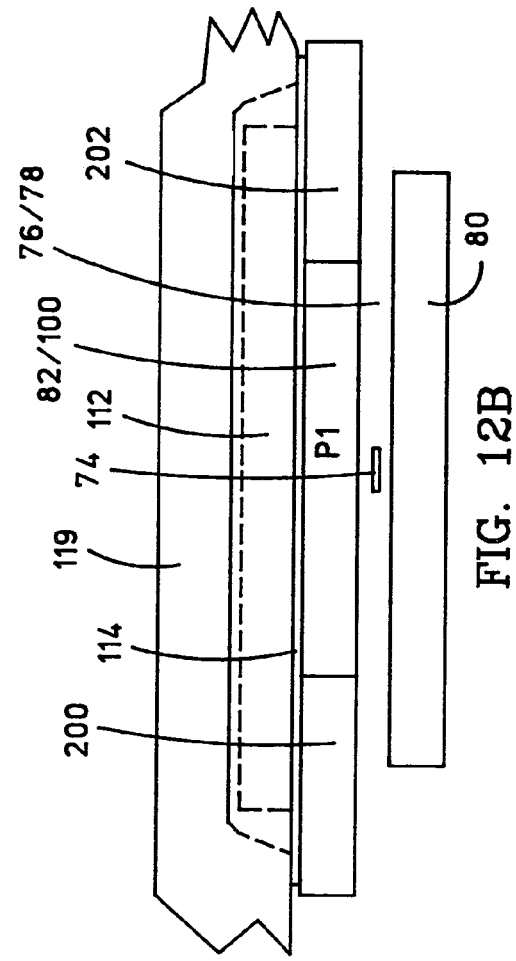
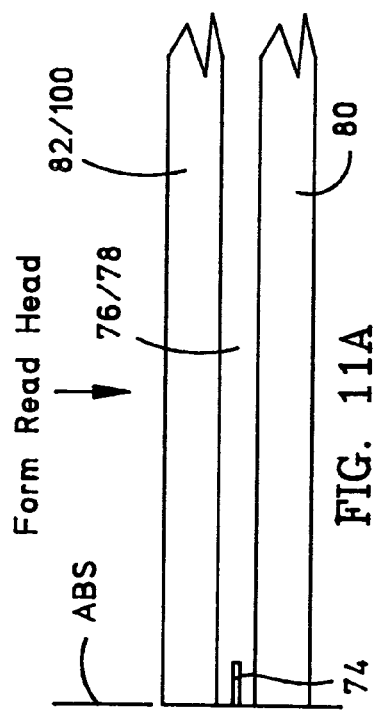
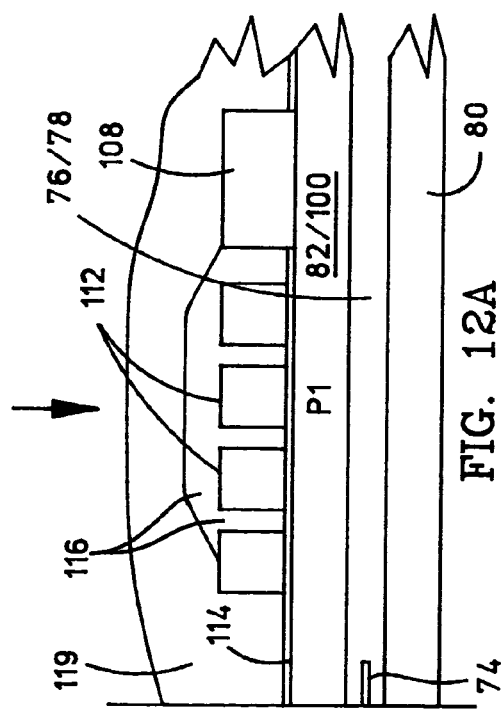

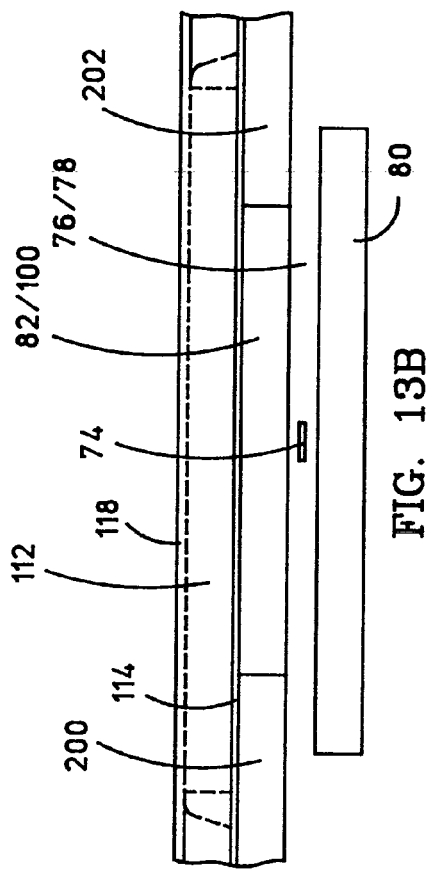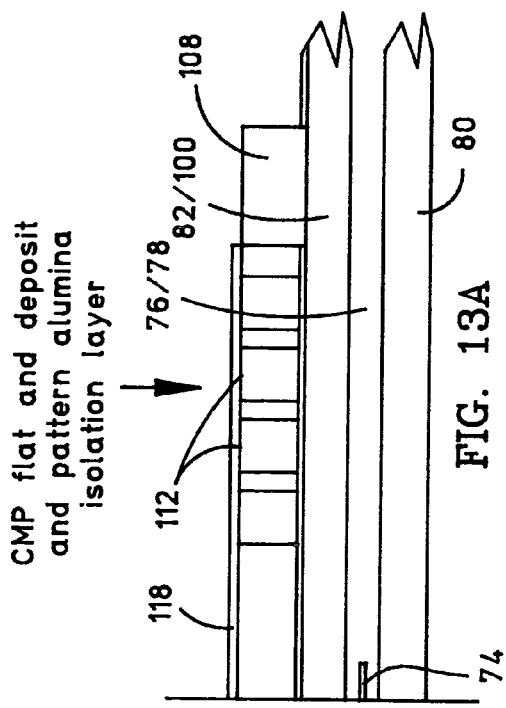
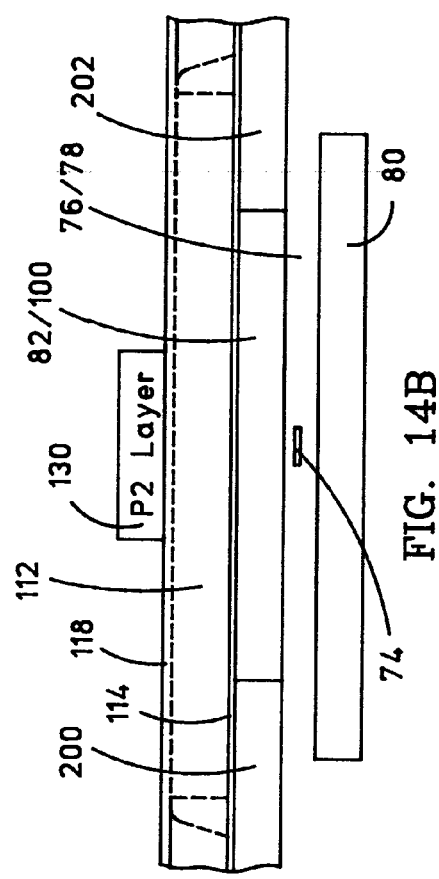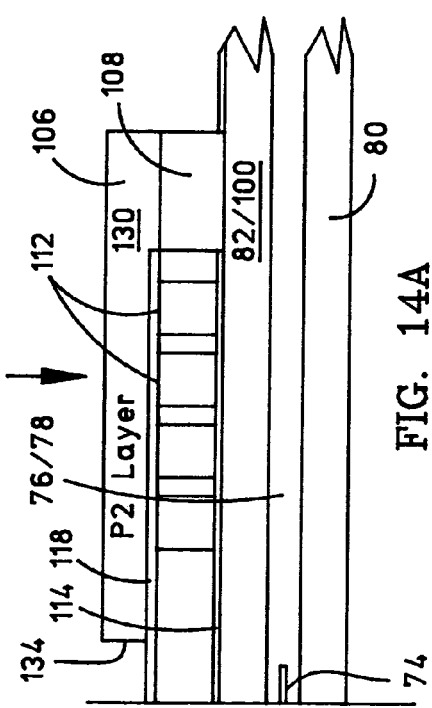

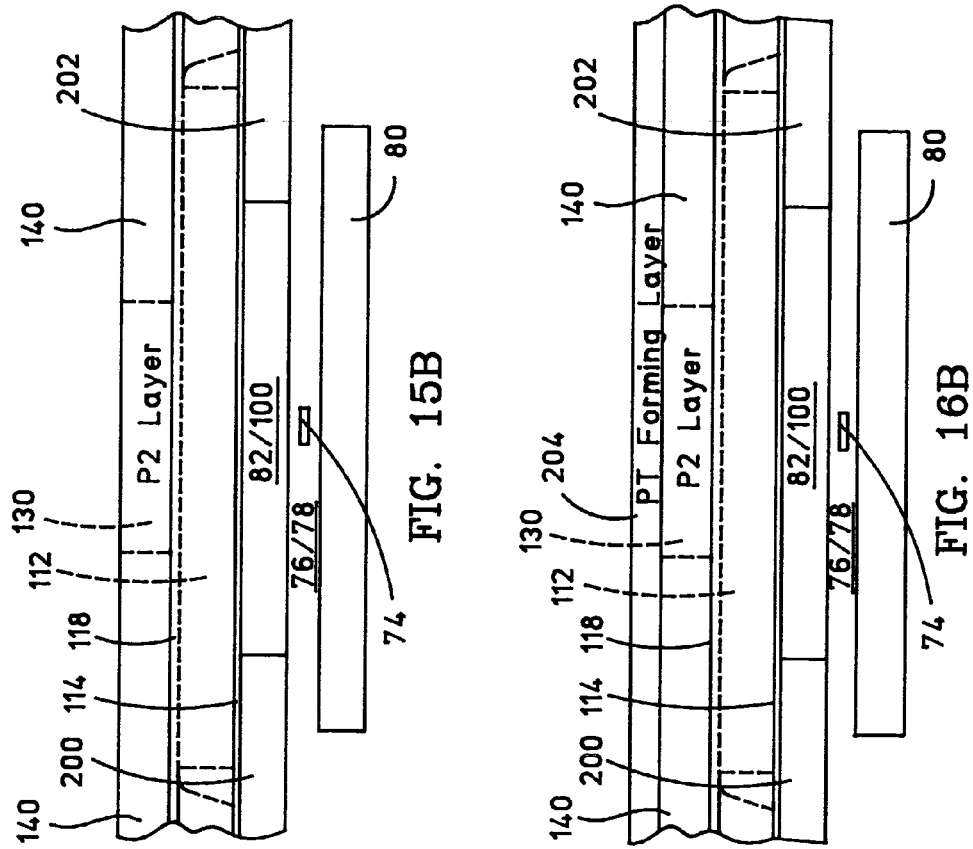
FIG. 15A
FIG. 15B
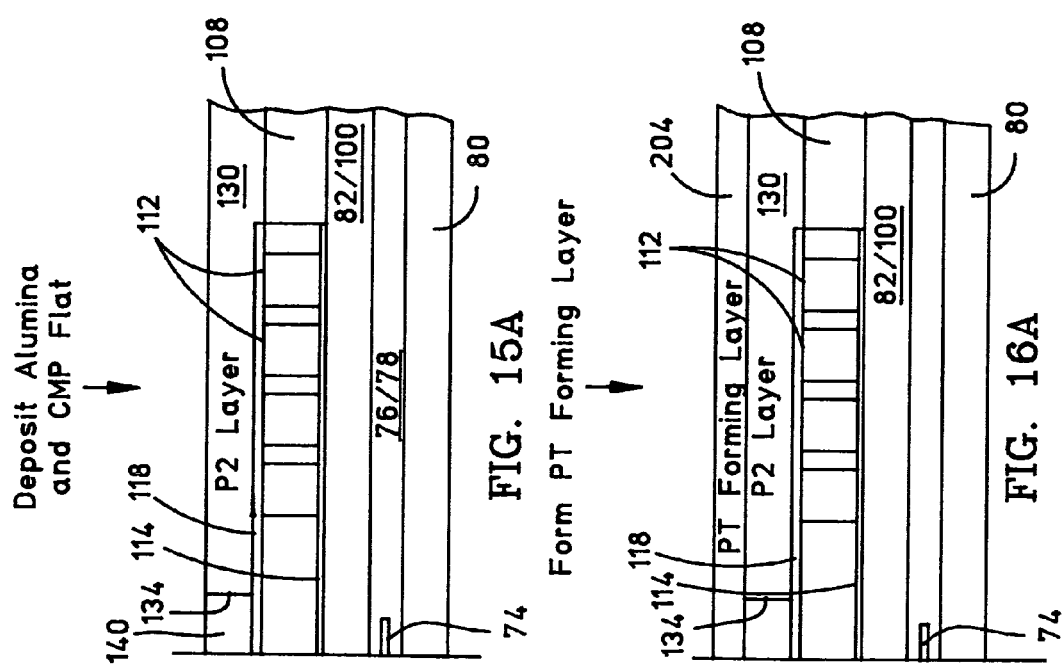
FIG. 16A
FIG. 16B

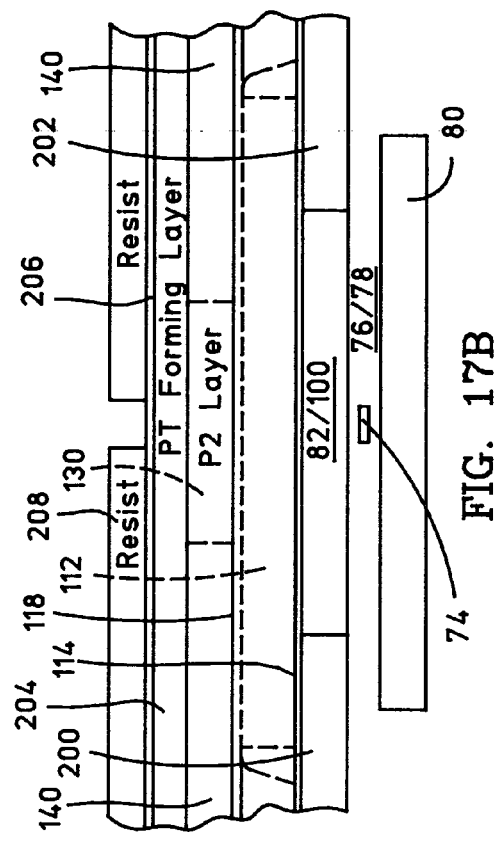
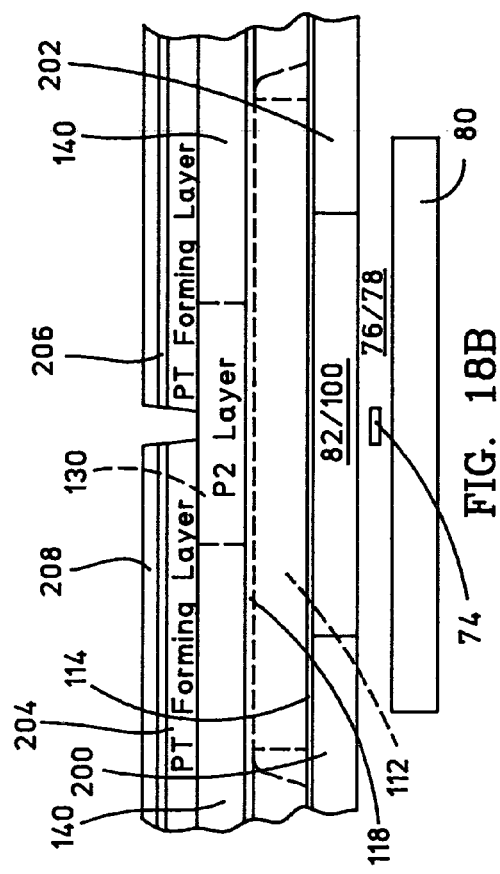
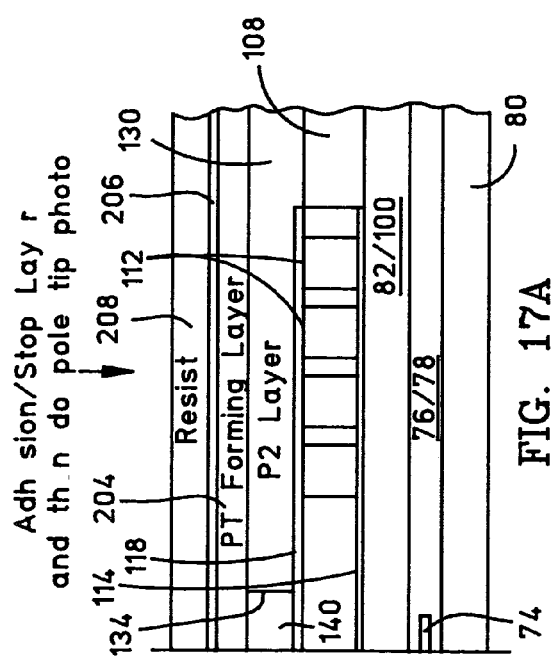
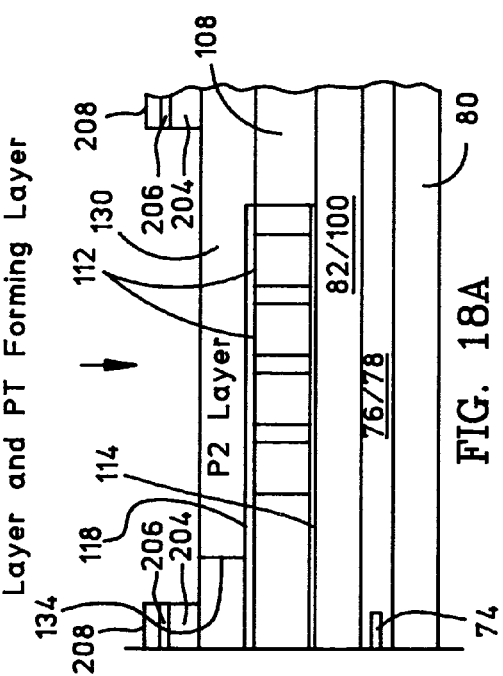

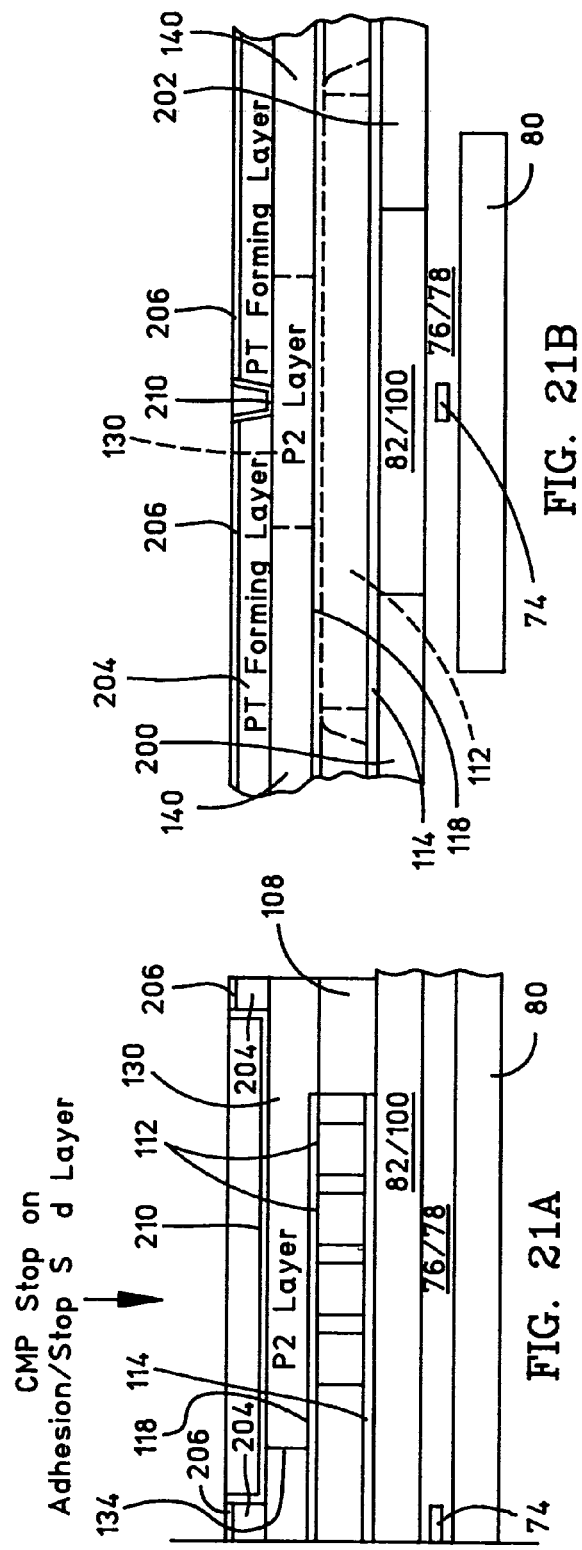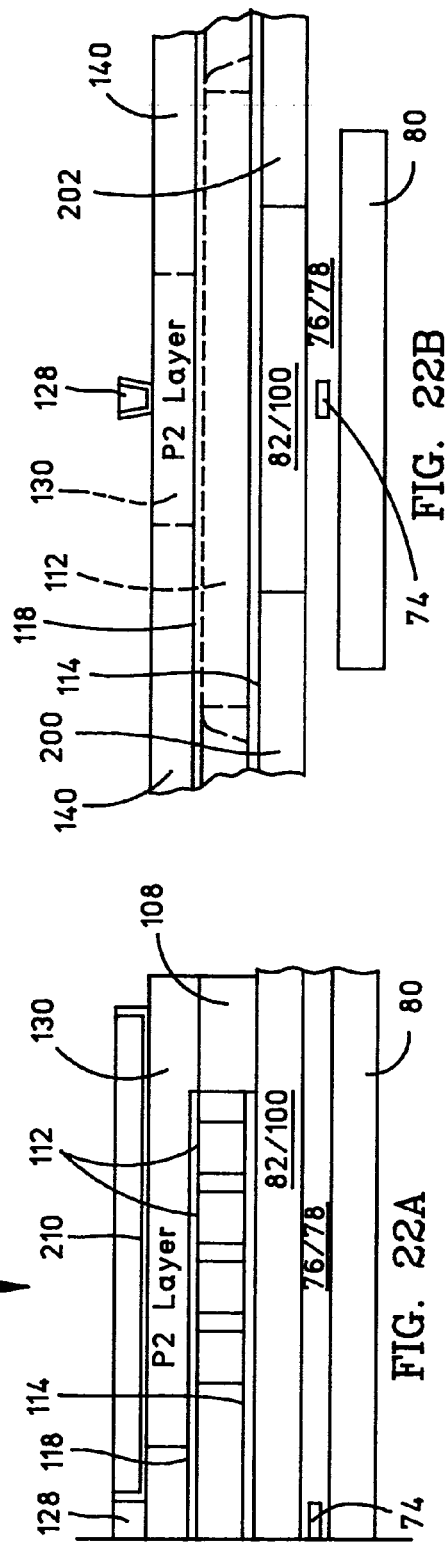

METHOD OF MAKING A PERPENDICULAR RECORDING MAGNETIC HEAD POLE TIP WITH AN ETCHABLE ADHESION CMP STOP LAYER

BACKGROUND OF THE INVENTION

1. Field of the Invention

The present invention relates to a method of making a perpendicular recording magnetic head pole tip with an etchable adhesion CMP stop layer and, more particularly, to the steps in making the perpendicular recording pole tip wherein such a layer adheres well to bottom and top layers, is commonly etchable with the bottom layer, adheres well to the pole tip during chemical mechanical polishing (CMP) to prevent delamination and indicates a stop point during the CMP for proper pole tip definition.

2. Description of the Related Art

The heart of a computer is a magnetic disk drive which includes a rotating magnetic disk, a slider that has write and read heads, a suspension arm and an actuator arm. When the disk is not rotating the actuator arm locates the suspension arm so that the slider is parked on a ramp. When the disk rotates and the slider is positioned by the actuator arm above the disk, air is swirled by the rotating disk adjacent an air bearing surface (ABS) of the slider causing the slider to ride on an air bearing a slight distance from the surface of the rotating disk. When the slider rides on the air bearing the actuator arm positions the write and read heads over selected circular tracks on the rotating disk where field signals are written and read by the write and read heads. The write and read heads are connected to processing circuitry that operates according to a computer program to implement the writing and reading functions.

A write head is typically rated by its areal density which is a product of its linear bit density and its track width density. The linear bit density is the number of bits which can be written per linear inch along the track of the rotating magnetic disk and the track width density is the number of tracks that can be written per inch along a radius of the rotating magnetic disk. The linear bit density is quantified as bits per inch (BPI) and the track width density is quantified as tracks per inch (TPI). The linear bit density depends upon the length of the bit along the track and the track width density is dependent upon the width of the second pole tip at the ABS. Efforts over the years to increase the areal density have resulted in computer storage capacities increasing from kilobytes to megabytes to gigabytes.

The magnetic moment of each pole piece of a write head is parallel to the ABS and to the major planes of the layers of the write head. When the write current is applied to the coil of the write head the magnetic moment rotates toward or away from the ABS, depending upon whether the write signal is positive or negative. When the magnetic moment is rotated from the parallel position, magnetic flux fringing between the pole pieces writes a positive or a negative bit in the track of the rotating magnetic disk. As the write current frequency is increased, the linear bit density is also increased. An increase in the linear bit density is desirable in order to increase the aforementioned areal density which increase results in increased storage capacity.

There are two types of magnetic write heads. One type is a longitudinal recording write head and the other type is a perpendicular recording write head. In the longitudinal recording write head the flux induced into first and second pole pieces by a write coil fringes across a write gap layer, between the pole pieces, into the circular track of the rotating magnetic disk. This causes an orientation of the magnetization in the circular disk to be parallel to the plane of the disk which is referred to as longitudinal recording. The volume of the magnetization in the disk is referred to as a bit cell and the magnetizations in various bit cells are antiparallel so as to record information in digital form. The bit cell has a width representing track width, a length representing linear density and a depth which provides the volume necessary to provide sufficient magnetization to be read by a sensor of the read head. In longitudinal recording magnetic disks this depth is somewhat shallow. The length of the bit cell along the circular track of the disk is determined by the thickness of the write gap layer. The write gap layer is made as thin as practical so as to decrease the length of the bit cell along the track which, in turn, increases the linear bit density of the recording. The width of the second pole tip of the longitudinal write head is also made as narrow as possible so as to reduce the track width and thereby increase the track width density. Unfortunately, the reduction in the thickness of the write gap layer and the track width is limited because the bit cell is shallow and there must be sufficient bit cell volume in order to produce sufficient magnetization in the recorded disk to be read by the sensor of the read head.

In a perpendicular recording write head there is no write gap layer. The second pole piece has a pole tip with a width that defines the track width of the write head and a wider yoke portion which delivers the flux to the pole tip. At a recessed end of the pole tip the yoke flares laterally outwardly to its full width and thence to a back gap which is magnetically connected to a back gap of a first pole piece. The perpendicular write head records signals into a perpendicular recording magnetic disk. In the perpendicular recording magnetic disk a soft magnetic layer underlies a perpendicular recording layer which has a high coercivity $H_C$. The thicker disk permits a larger bit cell so that the length and the width of the cell can be decreased and still provide sufficient magnetization to be read by the read head. This means that the width and the thickness or height of the pole tip at the ABS can be reduced to increase the aforementioned TPI and BPI. The magnetization of the bit cell in a perpendicular recording scheme is perpendicular to the plane of the disk as contrasted to parallel to the plane of the disk in the longitudinal recording scheme. The flux from the pole tip into the perpendicular recording magnetic disk is in a direction perpendicular to the plane of the disk, thence parallel to the plane of the disk in the aforementioned soft magnetic underlayer and thence again perpendicular to the plane of the disk into the first pole piece to complete the magnetic circuit. Accordingly, the width of the perpendicular recording pole tip can be less than the width of the second pole tip of the longitudinal write head and the height or thickness of the perpendicular recording pole tip can be less than the length of the longitudinal recorded bit cell so as to significantly increase the aforementioned areal density of the write head.

The perpendicular recording pole tip is typically constructed by frame plating in the same manner as the construction of the second pole piece in a longitudinal recording head. It is desirable that the pole tip be fully saturated during the write function. This allows an increase in the write signal frequency so as to increase the linear density of the recording. Unfortunately, when the length of the pole tip is short, it is difficult to fabricate a narrow width pole tip because of the loss of the process window of the pole tip in a region where the pole tip meets the flared portion of the second pole piece.

SUMMARY OF THE INVENTION

One approach to overcome this problem is to fabricate the perpendicular recording pole tip by a damascene process whereby a planar, homogenous dielectric layer is deposited with a carbon or diamond like carbon (DLC) hard mask thereon to serve as a chemical mechanical polishing (CMP) stop layer. The hard mask is patterned by photoresist and the dielectric is etched to form a beveled deep trench. Either deposition of a seed layer followed by plating or sputter deposition of an appropriate material with high moment can be used to fill the trench. Pole tip definition is achieved by CMP the structure back to the hard mask. A silicon adhesion layer on top and bottom of the hard mask has been required for adhesion of the hard mask to the dielectric and photoresist layers, thus increasing the number of processing steps. Silicon has excellent adhesion to DLC but does not adhere well to high moment material such as NiFe, CoNiFe and CoFe, which frequently results in delamination of the high moment material which forms the pole tip during CMP.

In order to overcome the aforementioned problems with the damascene process the present invention provides a non-silicon commonly etchable adhesion CMP stop layer (adhesion/stop layer) in the process of fabricating the second pole piece pole tip. The adhesion layer is tantalum (Ta). The improved adhesion/stop layer has several desirable attributes, namely: (1) improved adherence to a bottom pole tip forming layer which may be selected from the group consisting of Mo, W, $Ta_2O_3$, $SiON_X$, $SiO_2$ and $Si_3N_4$, and to a top photoresist layer; (2) etchable by the same reactive ion etching (RIE) process that etches the forming layer; (3) adheres well to the iron alloys employed for the perpendicular recording second pole tip, such as NiFe, CoNiFe and CoFe, thereby preventing delamination of the pole tip during chemical mechanical polishing (CMP) to define the height of the pole tip; and (4) provides a stop indication during CMP so that the pole tip can be fabricated with a precise height.

A method of the invention comprises forming a second pole piece layer that is recessed from a head surface of the magnetic head assembly, forming a reactive ion etchable (RIEable) pole tip forming layer on the second pole piece layer, forming the adhesion/stop layer of Ta on the pole tip forming layer, forming a photoresist mask on the adhesion/stop layer with a first opening for patterning the adhesion/stop layer and the pole tip forming layer with a second opening, reactive ion etching (RIE) through the first opening to form the second opening, forming the second pole piece pole tip in the second opening with a top which is above a top of the adhesion/stop layer and chemically mechanically polishing (CMP) the top of the second pole piece pole tip until the CMP contacts the adhesion/stop layer. An aspect of the invention is that after forming the second pole piece layer and before forming the pole tip forming layer, alumina is formed on the second pole piece layer and in a field about the second pole piece layer and then CMP is implemented until a top of the second pole piece layer is exposed and a flat surface is formed, followed by forming the pole tip forming layer on the flat surface.

Other aspects of the invention will be appreciated upon reading the following description taken together with the accompanying drawings wherein the various figures are not to scale with respect to one another nor are they to scale with respect to the structure depicted therein.

BRIEF DESCRIPTION OF THE DRAWINGS

FIGS. 11A and 11B are a longitudinal view and an ABS view of the steps involved in fabricating the read head portion 72 of FIG. 6;

FIGS. 12A and 12B are the same as FIGS. 11A and 11B except the first pole piece has been planarized, the coils are fabricated, insulation is provided for the coils, a back gap has been constructed and an alumina layer has been deposited;

FIGS. 13A and 13B are the same as FIGS. 12A and 12B except the top of the partially completed head has been chemically mechanically polished (CMP) to provide a flat surface where an alumina isolation layer is formed;

FIGS. 14A and 14B are the same as FIGS. 13A and 13B except a second pole piece layer has been formed;

FIGS. 15A and 15B are the same as FIGS. 14A and 14B except an alumina layer has been deposited and CMP has been implemented to provide a flat surface;

FIGS. 16A and 16B are the same as FIGS. 15A and 15B except a hard mask has been formed;

FIGS. 17A and 17B are the same as FIGS. 16A and 16B except an adhesion/stop seed layer of Ta has been formed and a photoresist layer, which is being patterned, is formed on the Ta layer;

FIGS. 18A and 18B are the same as FIGS. 17A and 17B except reactive ion etching has been implemented into the hard mask and the adhesion/stop seed layer producing an opening for a second pole piece pole tip;

FIGS. 21A and 21B are the same as FIGS. 20A and 20B except the magnetic head has been CMP until the CMP reaches the adhesion/stop seed layer;

FIGS. 22A and 22B are the same as FIGS. 21A and 21B except the hard mask has been removed by RIE;

DESCRIPTION OF THE PREFERRED EMBODIMENTS

Magnetic Disk Drive

Figure 1:
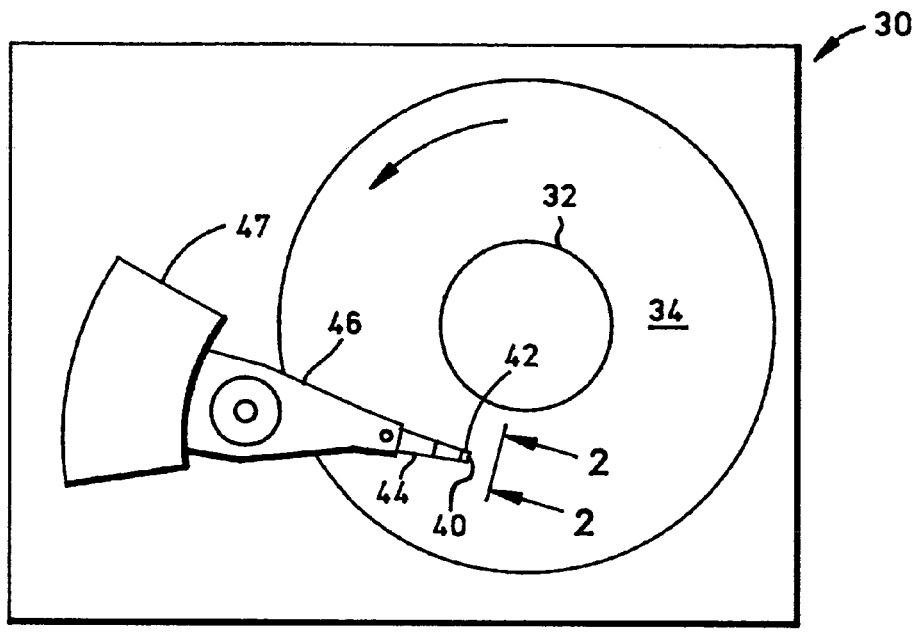
FIG. 1 is a plan view of an exemplary prior art magnetic disk drive.
Figure 2:
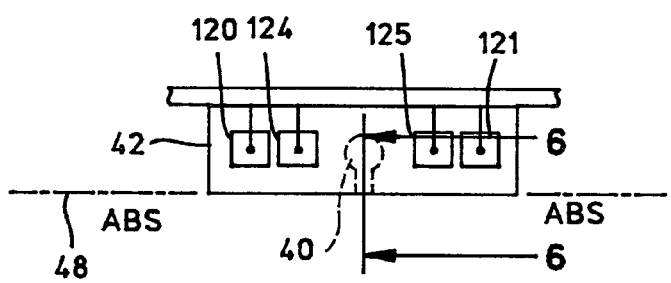
FIG. 2 is an end view of a prior art slider with a magnetic head of the disk drive as seen in plane 2—2 of FIG. 1.
Figure 3:
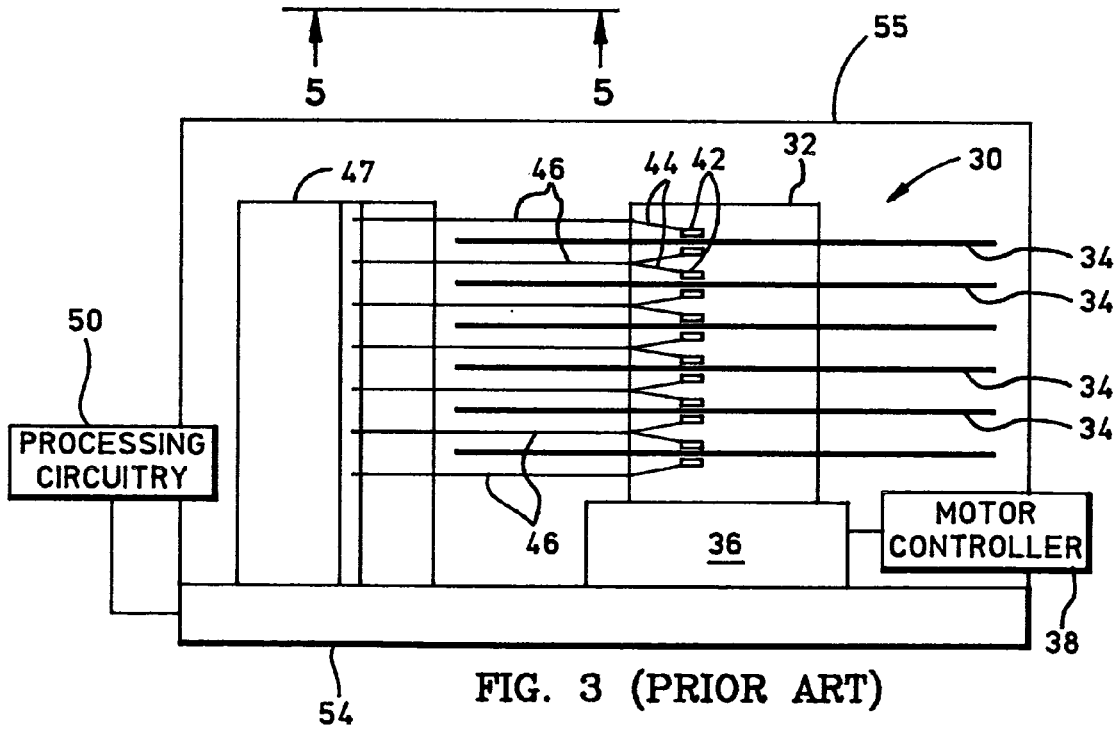
FIG. 3 is an elevation view of the prior art magnetic disk drive wherein multiple disks and magnetic heads are employed.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 and is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34.

Figure 4:
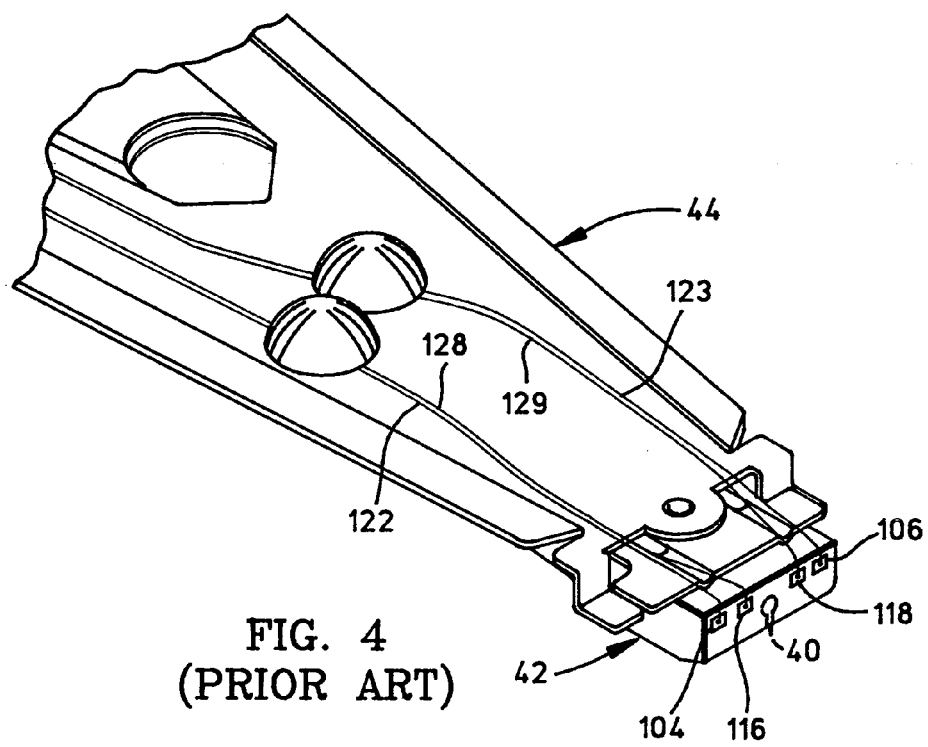
FIG. 4 is an isometric illustration of an exemplary prior art suspension system for supporting the slider and magnetic head.

When the disk 34 is rotated by the spindle motor 36 the slider is supported on a thin (typically, 0.05 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
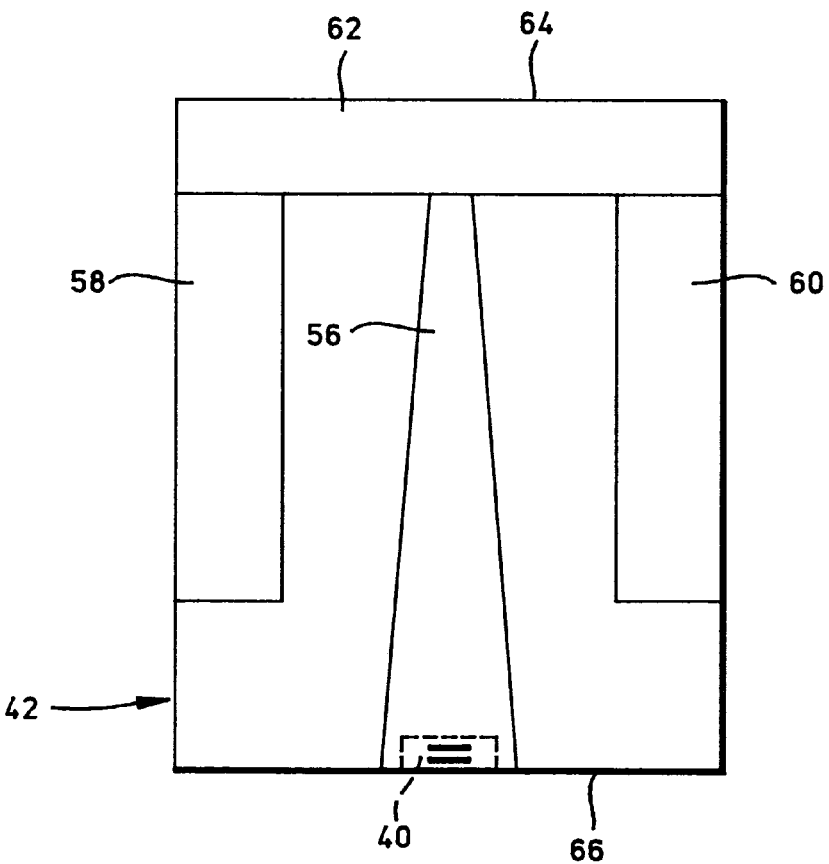
FIG. 5 is an ABS view of the magnetic head taken along plane 5—5 of FIG. 2.

FIG. 5 is an ABS view of the slider 42 and the magnetic head 40. The slider has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
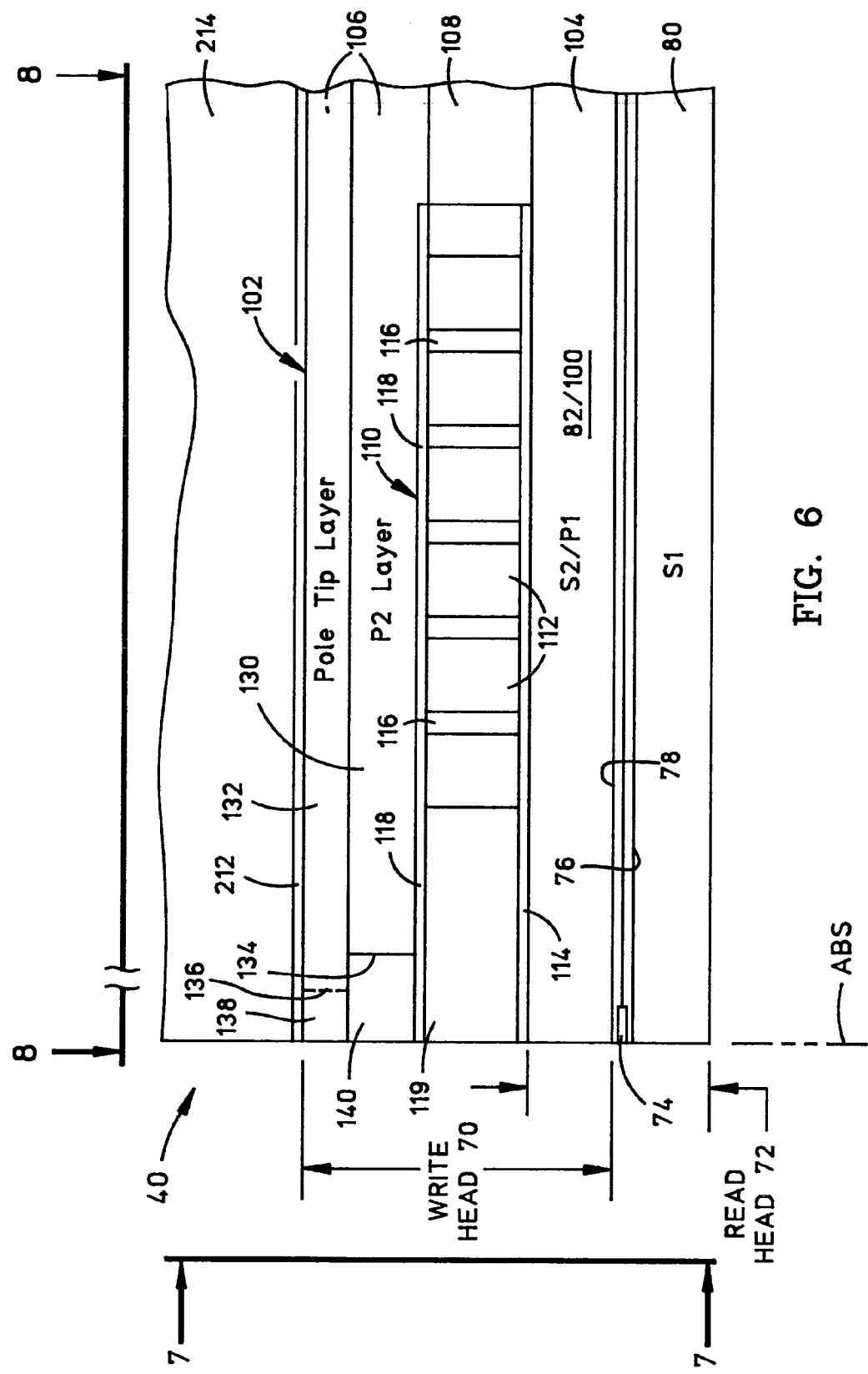
FIG. 6 is a longitudinal cross-sectional view of the slider taken along plane 6—6 of FIG. 2 showing the present perpendicular recording head in combination with a read head.
Figure 7:
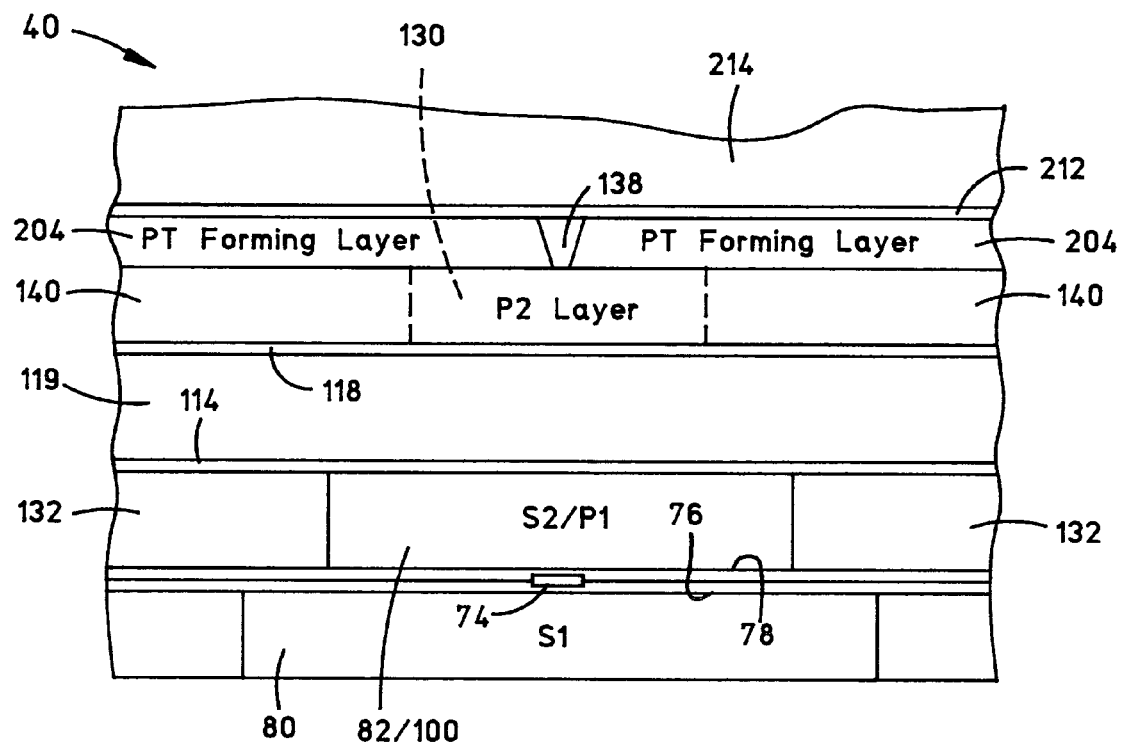
FIG. 7 is an ABS view of the slider taken along plane 7—7 of FIG. 6.

FIG. 6 is a side cross-sectional elevation view of a merged magnetic head assembly 40, which includes a write head portion 70 and a read head portion 72, the read head portion employing a read sensor 74. FIG. 7 is an ABS view of FIG. 6. The sensor 74 is sandwiched between nonmagnetic electrically nonconductive first and second read gap layers 76 and 78, and the read gap layers are sandwiched between ferromagnetic first and second shield layers 80 and 82. In response to external magnetic fields, the resistance of the sensor 74 changes. A sense current Is (not shown) conducted through the sensor causes these resistance changes to be manifested as potential changes. These potential changes are then processed as readback signals by the processing circuitry 50 shown in FIG. 3.

As shown in FIGS. 6 and 7, the write head portion 70 includes first and second pole pieces 100 and 102 which extend from the ABS to back gap portions 104 and 106 which are recessed in the head and which are magnetically connected to a back gap layer 108. Located between the first and second pole pieces 100 and 102 is an insulation stack 110 which extends from the ABS to the back gap layer 108 and has embedded therein at least one write coil layer 112. The insulation stack 110 may have a bottom insulation layer 114 which insulates the write coil from the first pole piece 100 and insulation layers 116 and 118 which insulate the write coil layer from the second pole piece 102, respectively. An alumina layer 119 is located between the coil layer and the ABS.

Figure 8:
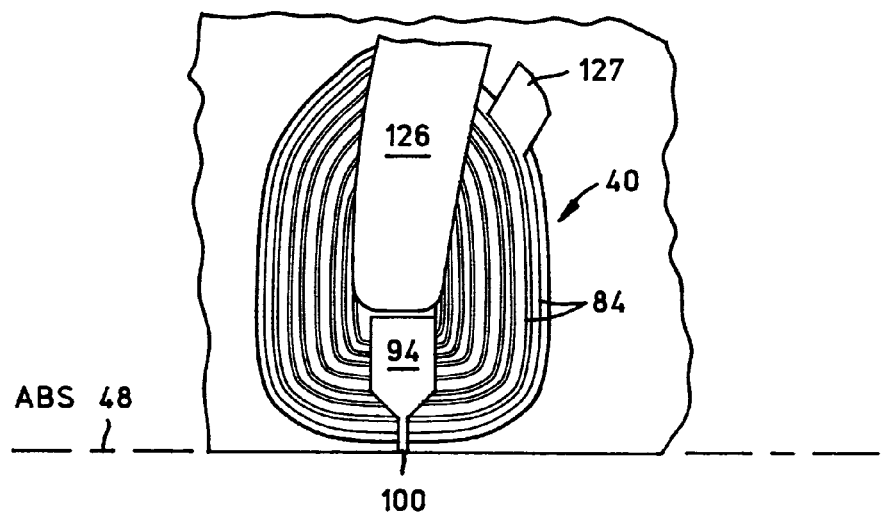
FIG. 8 is a view taken along plane 8—8 of FIG. 6 with all material above the coil layer and leads removed.

Since the second shield layer 82 and the first pole piece layer 100 are a common layer this head is known as a merged head. In a piggyback head the second shield layer and the first pole piece layer are separate layers which are separated by a nonmagnetic layer. As shown in FIGS. 2 and 4, first and second solder connections 120 and 121 connect leads (not shown) from the spin valve sensor 74 to leads 122 and 123 on the suspension 44, and third and fourth solder connections 124 and 125 connect leads 126 and 127 from the coil 84 (see FIG. 8) to leads 128 and 129 on the suspension.

Figure 9:
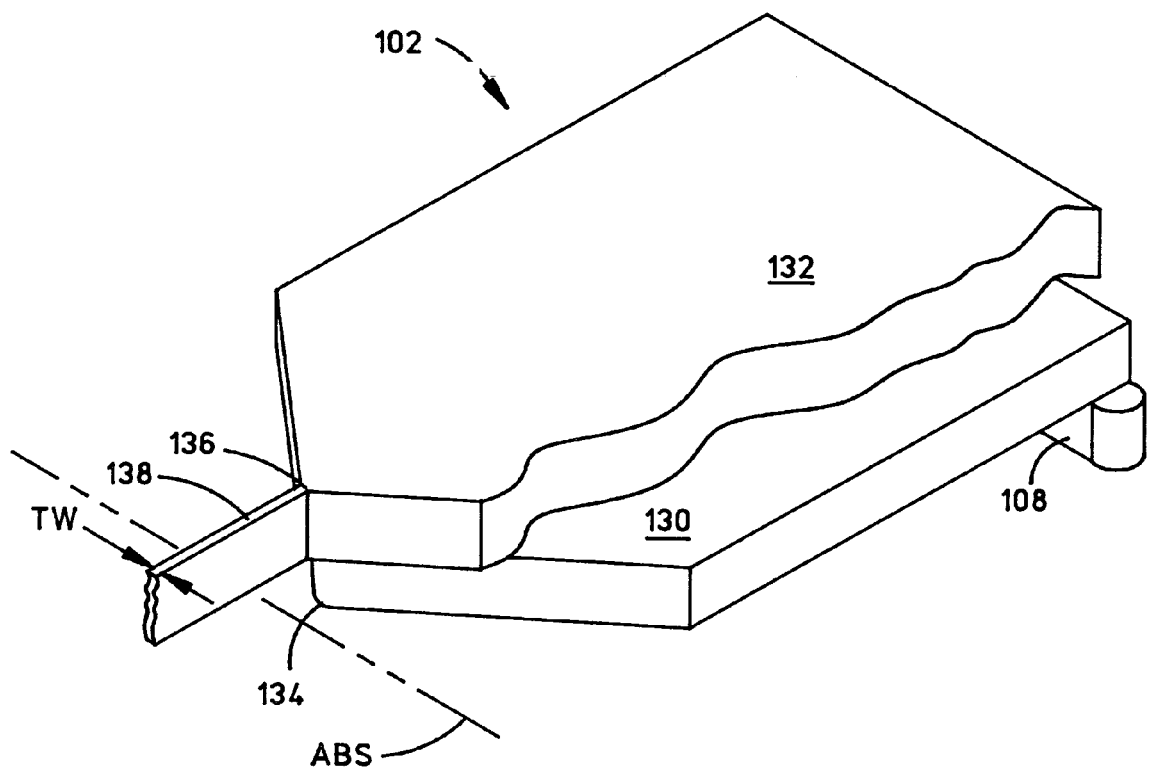
FIG. 9 is an isometric view of a second pole piece of FIG. 6 which includes a bottom pole piece and a top pole tip layer.
Figure 10:
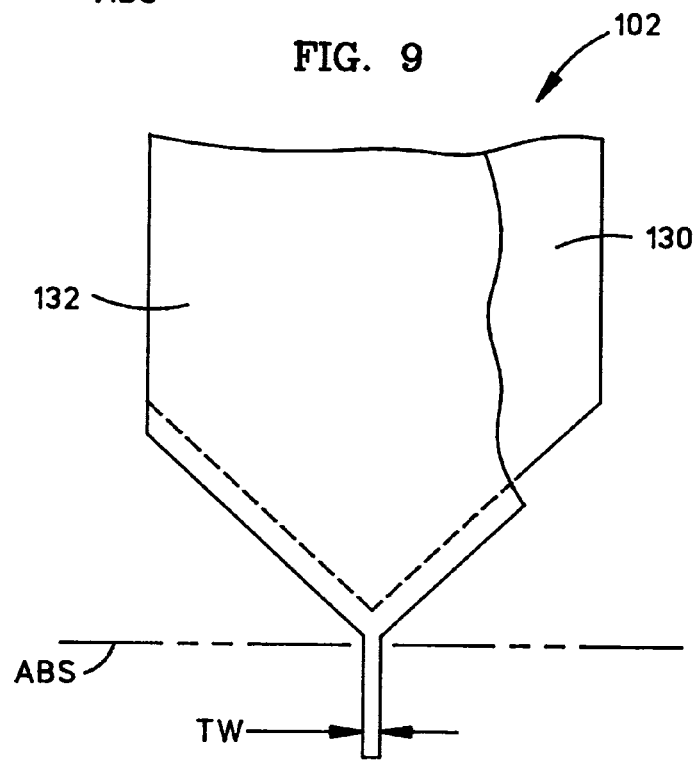
FIG. 10 is a top view of FIG. 9.

As shown in FIGS. 9 and 10, the second pole piece 102 includes a bottom ferromagnetic layer 130 and a top ferromagnetic pole tip layer 132. The layers 130 and 132 have flare points 134 and 136 where the layers first commence to extend laterally outwardly after the ABS. The pole tip layer 132 has a pole tip 138 and a yoke which is located between the pole tip 138 and the back gap 108 (see FIG. 6). The width of the top of the pole tip 138 is the track width (TW) of the recording head. The pole tip 138 is shown extended forward of the ABS in FIGS. 9 and 10 since this is its configuration when it is partially constructed on a wafer where rows and columns of magnetic head assemblies are fabricated. After completion of the magnetic head assemblies, which will be discussed hereinafter, the head assemblies are diced into rows of magnetic head assemblies and lapped to the ABS shown in FIG. 6. Each row of magnetic head assemblies is then diced into individual head assemblies and mounted on the suspensions, as shown in FIG. 3.

As shown in FIGS. 6 and 7, an insulative pole tip forming layer (PT forming layer) 140 is located between the flare point 134 and the ABS. The PT forming layer 140 is not a write gap layer as employed in a longitudinal recording head and therefore does not determine the linear bit density along the track of the rotating magnetic disk. In contrast, the thickness or height of the pole tip 138 along with media and spacing requirements determine the linear bit density since the flux signal magnetizes the bit cells in the recording disk in a perpendicular direction with the flux from the second pole piece returning to the first pole piece 100 via a soft magnetic layer in the perpendicular recording disk.

It should be noted that when the second pole piece layer 130 is employed, as shown in FIG. 9, the length of the head assembly 40 between the ABS and the back gap 108 can be shortened so that the write coil frequency can be increased for further increasing the linear bit density of the write head. It should also be understood that the magnetic head assembly may include multiple write coil layers which are stacked one above the other instead of a single write coil layer, as shown in FIG. 6, and still be within the spirit of the invention. In addition, the relative location and orientation of the write and read portions of the head may also vary.

Method of Making

FIGS. 11A and 11B to FIGS. 22A and 22B illustrate various steps in the fabrication of the magnetic head assembly 40 shown in FIGS. 6 and 7. In FIGS. 11A and 11B the first and second shield layers 80 and 82 may be fabricated by well-known frame plating techniques and the first and second read gap layers 76 and 78 and the sensor 74 may be fabricated by well-known vacuum deposition techniques.

In FIGS. 12A and 12B a thick alumina layer is deposited (not shown) and the thick alumina is chemically mechanically polished (CMP) to the first pole piece layer (P1) 100 leaving alumina layers 200 and 202 on each side of the first pole piece layer as shown in FIG. 12B. Next, the insulation layer 114, such as alumina, is deposited for insulating a subsequent write coil layer 112 from the first pole piece layer 100. The write coil layer 112 is then formed and is insulated by insulation 116 which may be baked photoresist. After photopatterning (not shown) and ion milling down to the first pole piece layer 100 the back gap 108 is formed. This is followed by depositing a thick layer of alumina 119. In FIGS. 13A and 13B the magnetic head is CMP flat and an isolation layer 118, which may be alumina, is deposited and patterned so as to leave the back gap 108 exposed.

In FIGS. 14A and 14B the second pole piece (P2) layer 130 is formed with a front end 134 which is recessed from the ABS and the back gap portion 106 which is magnetically connected to the back gap 108. In FIGS. 15A and 15B a thick alumina layer is deposited (not shown) and CMP flat leaving the alumina layer 140 between the front end 134 of the second pole piece layer and the ABS. In FIGS. 16A and 16B a pole tip forming layer (PT forming layer) 204 is formed on the second pole piece layer 130 and the alumina layer 140 which provides a form for fabricating the pole tip layer 132 with the pole tip 138 which will be discussed in more detail hereinafter. The mask may be Mo, W, $Ta_2O_3$, $SiON_X$, $SiO_2$ or $Si_3N_4$ and is etchable by a fluorine based reactive ion etching (RIE). In FIGS. 17A and 17B an adhesion/stop layer 206 is formed on the PT forming layer 204 followed by a photoresist layer 208 which is photopatterned to define a shape of the second pole tip layer 132 which includes the perpendicular recording pole tip 138, as shown in FIG. 6.

Figure 19A:
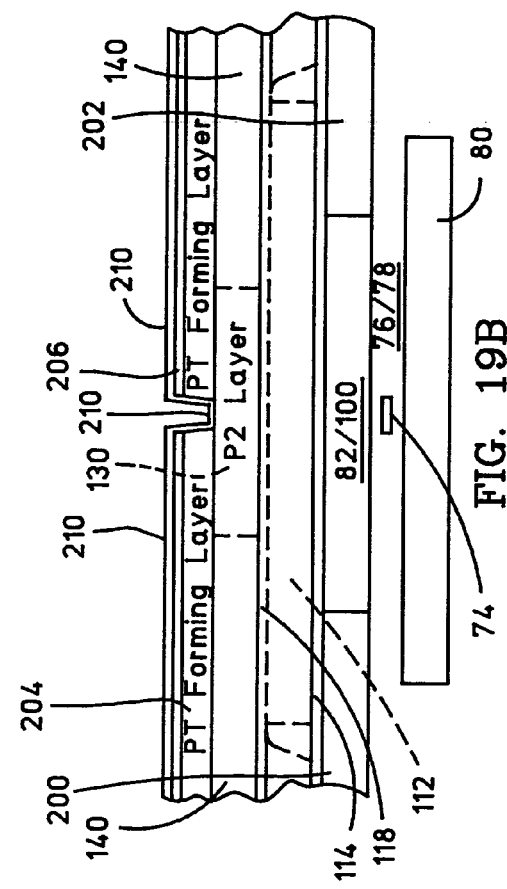
FIGS. 19A and 19B are the same as FIGS. 18A and 18B except a NiFe seed layer has been formed in the opening.
Figure 19B:
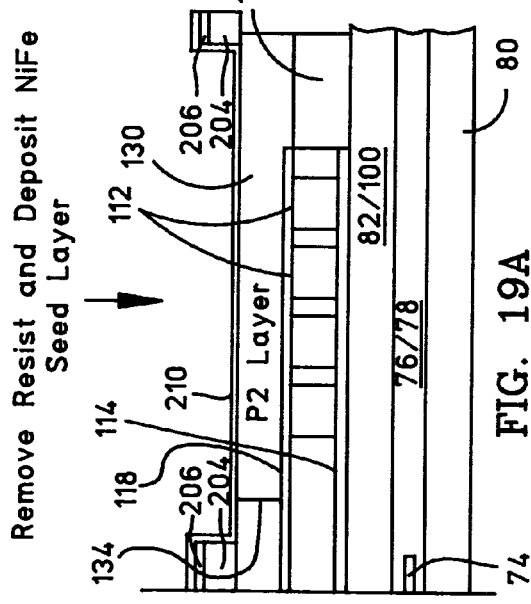
Figure 20A:
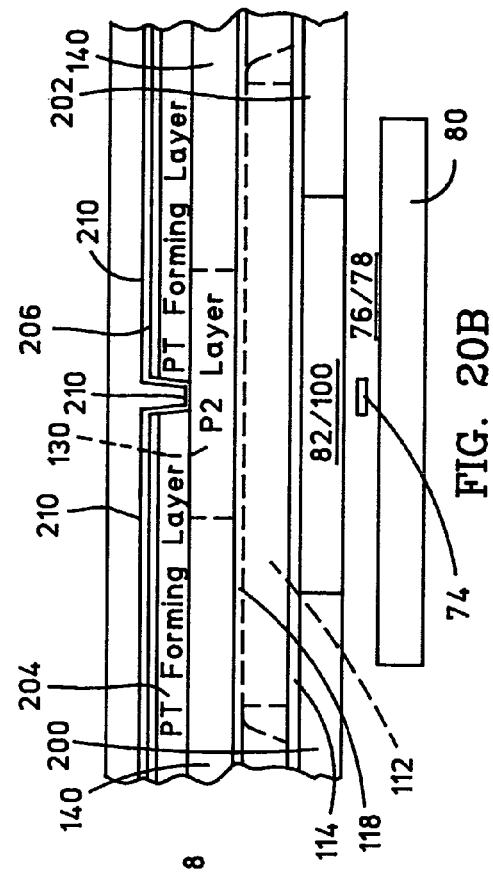
FIGS. 20A and 20B are the same as FIGS. 19A and 19B except the opening has been filled with ferromagnetic material.
Figure 20B:
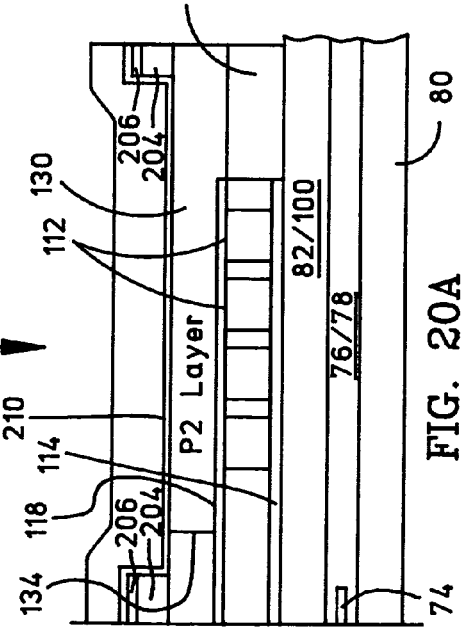

The adhesion/stop layer 206 is tantalum (Ta). A Ta adhesion/stop layer provides all of the desirable attributes as described hereinabove. In FIGS. 18A and 18B a fluorine based reactive ion etch is implemented into the adhesion/stop layer and into the PT forming layer for producing a slanted profile for the pole tip 138 as shown in FIG. 7. An aspect of this invention is that both of the adhesion/stop layer 206 and the PT forming layer 204 can be etched by the same fluorine based RIE step. As can be seen from FIGS. 18A and 18B a trench is formed for the second pole tip layer. In FIGS. 19A and 19B a seed layer 210 is sputter deposited into the trench as well as on the front and rear pedestals or the trench may be filled with a ferromagnetic material, such as CoFe, by sputtering (not shown). In FIGS. 20A and 20B plating is implemented to fill the trench to a level slightly above the front and rear pedestals. In FIGS. 21A and 21B CMP is implemented until the CMP stops on the adhesion/stop layer 206. In FIGS. 22A and 22B, optionally, fluorine based RIE may be implemented to remove any remaining portions of the hard mask layer. A thick alumina layer may then be deposited (not shown) and the magnetic head planarized leaving an alumina layer 212 as shown in FIG. 6. A capping layer 214, as shown in FIG. 6, may then be formed of any suitable material such as alumina.

Perpendicular Recording Pole Tip

Figure 23:
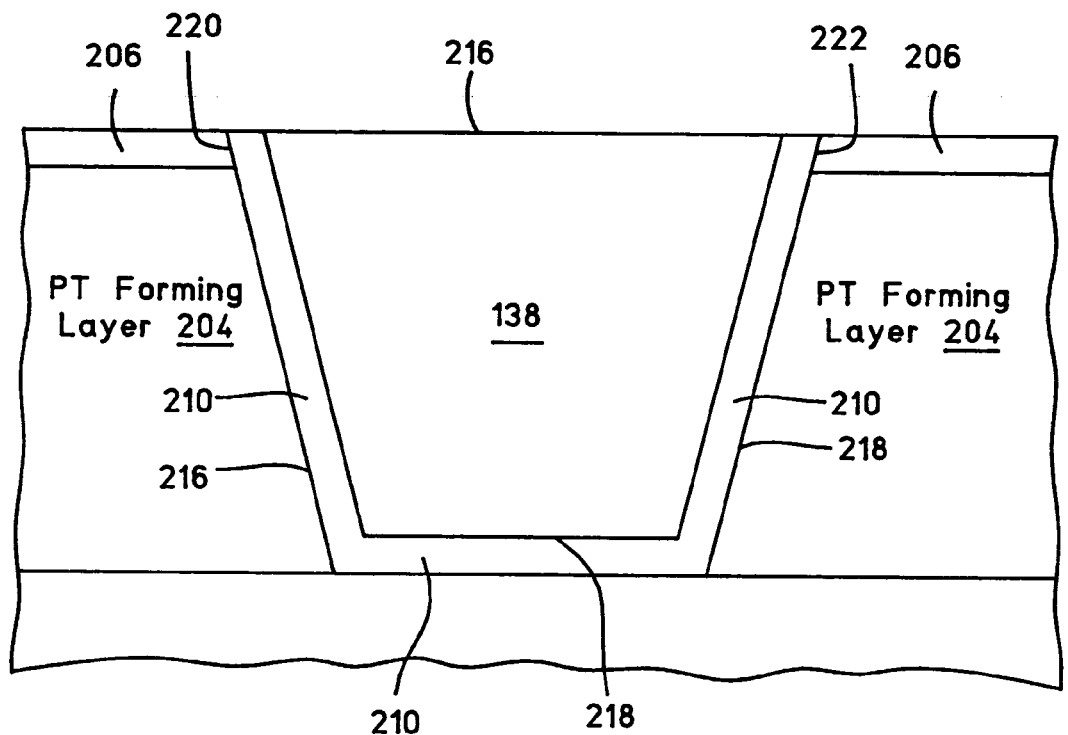
FIG. 23 is an enlarged ABS illustration of the perpendicular recording pole tip in FIG. 22B.
Figure 24:
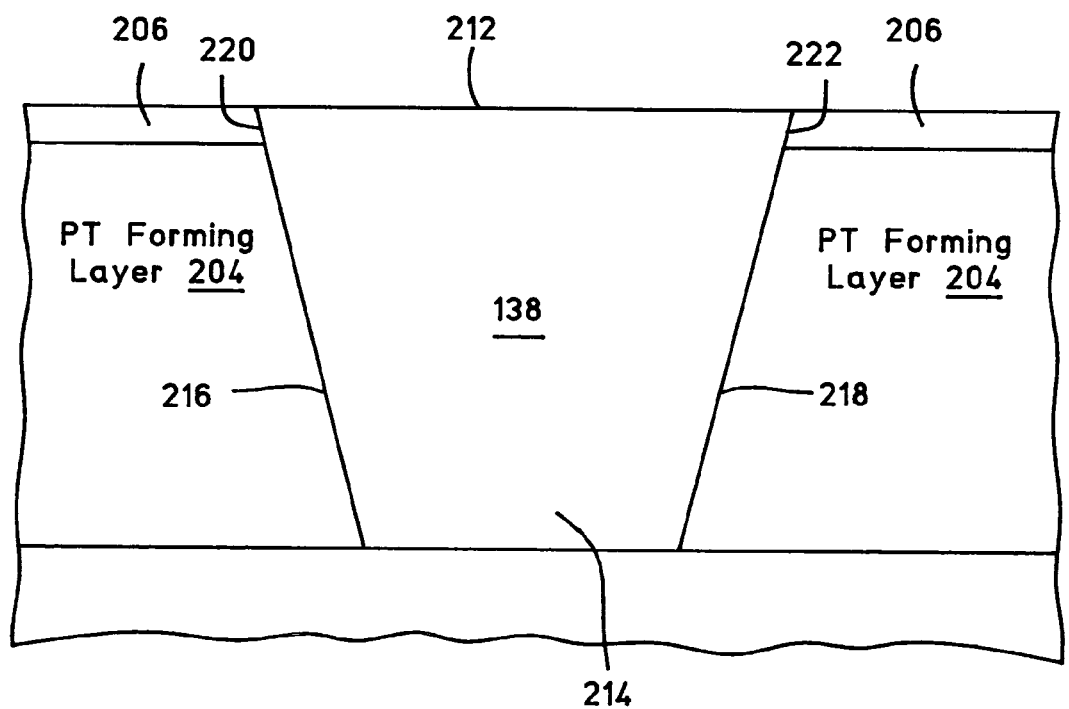
FIG. 24 is an enlarged ABS illustration of another embodiment of the perpendicular recording second pole tip.

The perpendicular recording pole tip 138, as shown in FIG. 21B, is enlarged substantially in FIG. 23. FIG. 23 shows the seed layer 210 which is employed when the pole tip 138 is plated. As shown in FIGS. 6 and 23, the pole tip is bounded by oppositely facing ABS and back surfaces, top and bottom surfaces 216 and 218 and, with the seed layer 210, first and second side surfaces 216 and 218. As shown in FIG. 23, edge surfaces of layer portions 206 of the adhesion/stop seed layer interface first and second top side surface portions 220 and 222. Because of the good adhesion between the adhesion/stop seed layer portions 206 and the pole tip 138 there is no delamination at the interfaces 220 and 222 during the CMP step in FIGS. 21A and 21B. FIG. 24 is the same as FIG. 23 except the pole tip 138 has been sputter deposited which eliminates the need for the seed layer 210 shown in FIG. 23.

Discussion

It should be understood that vacuum deposition may be employed in lieu of the aforementioned frame plating step. Further, in a broad concept of the invention the pole tip layer can be employed without the aforementioned bottom second pole piece layer. The materials of the various layers are optional in some instances. For instance, photoresist may be employed in lieu of the alumina layers and vice versa. Further, while the magnetic head is planarized at various steps, planarization may occur only for the second pole piece and pole tip layers. Further, the magnetic head assembly may be a merged or piggyback head, as discussed hereinabove. The pole pieces are ferromagnetic materials and are preferably nickel-iron. It should be noted that the second pole piece layer may be a different ferromagnetic material than the pole tip layer. For instance, the second pole piece layer may be $Ni_{45}Fe_{55}$ and the pole tip layer may be $Ni_{80}Fe_{20}$.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A method of making a magnetic head assembly, which has a head surface, comprising the steps of:
   forming a pole piece layer that is recessed from the head surface;
   forming a reactive ion etchable pole tip forming layer on the pole piece layer;
   forming an adhesion/stop layer of tantalum (Ta) on the pole tip forming layer;
   the adhesion/stop layer being commonly reactive ion etchable with the pole tip forming layer;
   forming a photoresist mask on the adhesion/stop layer with an opening for patterning the adhesion/stop layer and the pole tip forming layer with another opening;
   reactive ion etching through said opening to form said another opening;
   forming a pole piece pole tip in said another opening with a top which is above a top of the adhesion/stop layer; and
   chemical mechanical polishing the top of the pole piece pole tip until the chemical mechanical polishing contacts the adhesion/stop layer.

2. A method as claimed in claim 1 wherein the pole tip forming layer is selected from the group consisting of Mo, W, $Ta_2O_3$, $SiON_X$, $SiO_2$ and $Si_3N_4$.

3. A method as claimed in claim 2 including the steps of:
   after forming the pole piece layer and before forming the pole tip forming layer, depositing alumina on the pole piece layer and in a field about the pole piece layer;
   chemical mechanical polishing the alumina and the pole piece layer until a top of the pole piece layer is exposed and a flat surface is formed; and
   forming the pole tip forming layer on the flat surface.

4. A method as claimed in claim 3 including the steps of:
   forming a read head;
   forming an insulation stack with a coil layer embedded therein on the read head;
   planarizing the insulation stack; and
   said pole piece layer being formed on said insulation stack.

5. A method as claimed in claim 3 wherein the pole piece pole tip is formed by plating.

6. A method as claimed in claim 3 wherein the pole piece pole tip is formed by sputtering.

7. A method as claimed in claim 3 wherein after forming the pole tip a remainder of the pole tip forming layer is removed by reactive ion etching.

* * * * *